(12) United States Patent
Xu et al.

(10) Patent No.: US 11,981,872 B2
(45) Date of Patent: May 14, 2024

(54) SYSTEMS AND METHODS FOR RENEWABLE FUELS

(71) Applicant: EXXONMOBIL TECHNOLOGY AND ENGINEERING COMPANY, Annandale, NJ (US)

(72) Inventors: Xiaochun Xu, Annandale, NJ (US); Gordon B. Mcgarvey, Annandale, NJ (US); Vincent A. Brunet, Annandale, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 18/210,878

(22) Filed: Jun. 16, 2023

(65) Prior Publication Data

US 2023/0407191 A1 Dec. 21, 2023

Related U.S. Application Data

(60) Provisional application No. 63/353,747, filed on Jun. 20, 2022.

(51) Int. Cl.
*C10G 47/20* (2006.01)
*C10G 67/00* (2006.01)

(52) U.S. Cl.
CPC ............. *C10G 47/20* (2013.01); *C10G 67/00* (2013.01); *C10G 2300/1014* (2013.01); *C10G 2300/30* (2013.01)

(58) Field of Classification Search
CPC ...... G06F 3/013; G06F 3/017; G06F 3/04883; G06F 3/165; G10L 15/22; G10L 19/008;

(Continued)

(56) References Cited

U.S. PATENT DOCUMENTS

| 11,613,715 B1* | 3/2023 | Womeldorff ............. C10G 3/50 585/14 |
| 2009/0044444 A1* | 2/2009 | Sugano .................. C10G 47/02 44/300 |

(Continued)

FOREIGN PATENT DOCUMENTS

| WO | 2010/077476 A2 | 7/2010 |
| WO | 2020/083997 A1 | 4/2020 |

OTHER PUBLICATIONS

Farzin et al. Determination of Metal Contents in Edible Vegetable Oils Produced in Iran Using Microwave-assisted Acid Digestion; Journal of Applied Chemical Research, 8, 3, pp. 35-43 (2014) (Year: 2014).*

(Continued)

*Primary Examiner* — Ellen M McAvoy
*Assistant Examiner* — Chantel Graham
(74) *Attorney, Agent, or Firm* — Shook, Hardy & Bacon L.L.P.

(57) ABSTRACT

This application relates to production of renewable fuels, including a method of producing renewable fuels. The method comprises hydrotreating a biofeedstock by contacting reactants comprising a combined feedstock and hydrogen with a hydrotreating catalyst to produce normal paraffins. The combined feedstock comprises a biofeedstock and an additional feedstock. The biofeedstock has about 10% or more of each of metals, phosphorous, and chlorophyll than the additional feedstock. The biofeedstock comprises the metals in an amount of about 300 parts per million ("ppm") or less, the phosphorous in an amount of about 300 ppm or less, and the chlorophyll in an amount of about 50 ppm or less. The method further comprises isomerizing at least a portion of the normal paraffins to produce branched paraffins in an isomerization effluent.

22 Claims, 6 Drawing Sheets

(58) Field of Classification Search
CPC .......... G10L 2015/223; G10L 21/0208; H03G 3/3005; H03G 3/32; H03G 7/002; H04L 12/2803; H04L 65/70; H04L 67/52; H04R 1/326; H04R 2499/15; H04S 2400/11; H04S 2400/13; H04S 2420/01; H04S 2420/03; H04S 2420/11; H04S 3/008; H04S 7/303; H04S 7/304; H04W 84/042
See application file for complete search history.

(56) References Cited

U.S. PATENT DOCUMENTS

| | | |
|---|---|---|
| 2009/0250376 A1 | 10/2009 | Brandvold et al. |
| 2011/0160505 A1 | 6/2011 | McCall |
| 2013/0305591 A1 | 11/2013 | McCall et al. |
| 2014/0148626 A1 | 5/2014 | Parimi et al. |
| 2014/0187828 A1* | 7/2014 | Bauldreay ................ C10G 3/49 585/14 |
| 2014/0296590 A1 | 10/2014 | Luebke et al. |

OTHER PUBLICATIONS

Laska-Zieja et al. Low-Cost Investment with High Quality Performance. Bleaching Earths for Phosphorus Reduction in the Low-Temperature Bleaching Process of Rapeseed Oil; Published online May 8, 2020 (Year: 2020).*

YCW Quality and Identity Characteristics—Part 2—Chemical Characteristics; Aug. 31, 2014 (Year: 2014).*

International Search Report and Written Opinion received for PCT Application No. PCT/US2023/025513, dated Sep. 12, 2023, 14 pages.

* cited by examiner

SYSTEMS AND METHODS FOR RENEWABLE FUELS

CROSS REFERENCE TO RELATED APPLICATIONS

This application claims the benefit of U.S. Provisional Application No. 63/353,747 filed Jun. 20, 2022.

FIELD

This application relates to production of renewable fuels and, more particularly, one or more embodiments relate to the production of renewable fuels using lower quality feedstocks.

BACKGROUND

Oxygenate compounds are typically not thermally stable and cause fouling of process equipment, such as heat exchangers, furnaces, and reactors, among others. Metals can deposit on the FCC and hydroprocessing catalyst causing catalyst deactivation or in fixed bed reactor causing reactor pressure drop issues. Therefore, in some petroleum processes, significant effort is undertaken to remove the metals before the feed contacts the active catalyst. For example, silicon traps, arsenic traps, and demetallation catalysts are often used.

Because biofeedstocks contain oxygenate compounds and a high metal (ash) content, they often cause fouling and catalysts deactivation in the process for conversion of biomass feedstock to renewable fuels. For example, pyrolysis oil from lignocellulosic biomass is not thermally stable. To reduce fouling from fluid catalytic cracking of this biomass pyrolysis oil, a dedicated injection nozzle with cooling is used. Another example process with fouling issues is the renewable fuel process with feeds including triglycerides, fatty-acid methylesters (FAME), and free-fatty acids. To avoid catalyst fouling and de-activation with these feeds, a strict feedstock specification is applied. This feedstock specification typically requires a pretreatment process to remove contaminants. One such pretreatment process includes refining, bleaching, and deodorization, for example, to provide RBD oil that can then be processed to produce fuel-range hydrocarbons. Lower quality pretreatment processes, such as degumming, result in a lower quality feedstock (e.g., degummed oil) that can cause significant fouling of process equipment.

SUMMARY

Disclosed herein is an example method of producing renewable fuels. The method includes hydrotreating a biofeedstock by contacting reactants including a combined feedstock and hydrogen with a hydrotreating catalyst to produce normal paraffins. The combined feedstock includes a biofeedstock and an additional feedstock. The biofeedstock has about 10 wt. % or more of each of metals, phosphorous, and chlorophyll than the additional feedstock. The biofeedstock includes the metals in an amount of about 300 parts per million ("ppm") or less, the phosphorous in an amount of about 300 ppm or less, and the chlorophyll in an amount of about 50 ppm or less. The method further includes isomerizing at least a portion of the normal paraffins to produce branched paraffins in an isomerization effluent.

Disclosed herein is another example method of producing renewable fuels. The method includes hydrotreating a biofeedstock by contacting reactants including a combined feedstock and hydrogen with a hydrotreating catalyst to produce normal paraffins. The combined feedstock includes a first vegetable oil and a second vegetable oil. The second vegetable oil is present in an amount of about 50 wt. % or less. The second vegetable oil has about 10 wt. % or more of each of metals, phosphorous, and chlorophyll than the biofeedstock. The second vegetable oil includes the metals in an amount of about 200 ppm or less, the phosphorous in an amount of 200 ppm or less, and the chlorophyll in an amount of about 30 ppm or less. The first vegetable oil includes the metals in an amount of about 10 ppm or less, the phosphorous in an amount of about 2 ppm or less, and the chlorophyll in an amount of about 1 ppm or less. The method further includes isomerizing at least a portion of the normal paraffins to produce branched paraffins in an isomerization effluent. The method further includes separating at least a jet range fraction and a diesel range fraction from the isomerization effluent.

These and other features and attributes of the disclosed methods and systems of the present disclosure and their advantageous applications and/or uses will be apparent from the detailed description which follows.

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
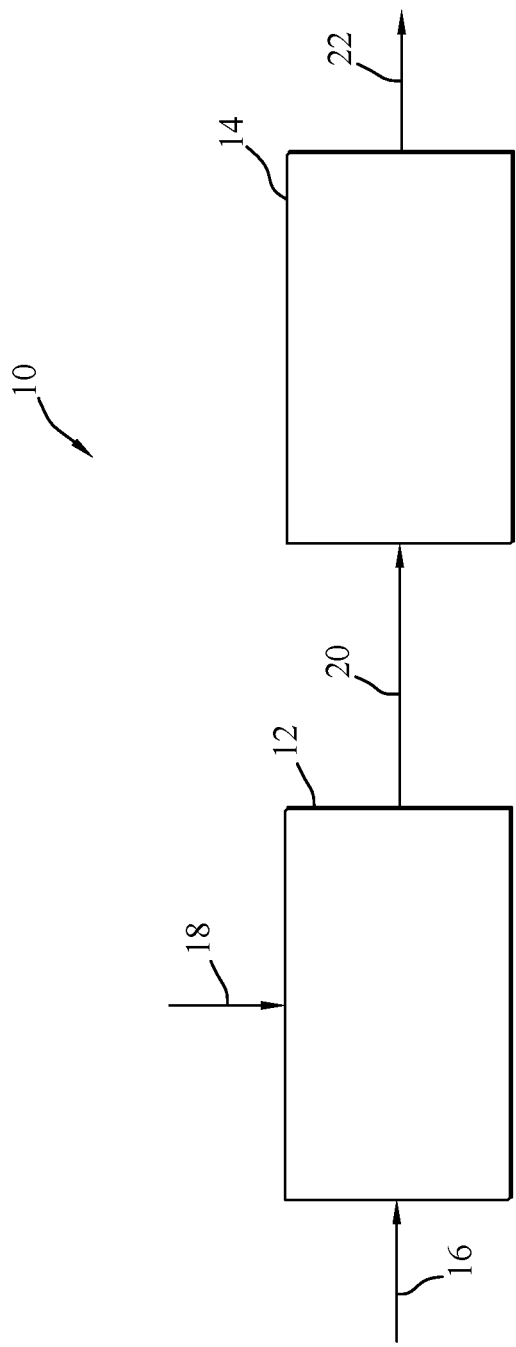
FIG. 1 is a block flow diagram of a process for producing renewable fuels from biofeedstocks in accordance with one or more embodiments.

This application relates to production of renewable fuels and, more particularly, one or more embodiments relate to the production of renewable fuels using lower quality feedstocks. In some embodiments, biofeedstocks of different qualities are co-processed to produce fuel-range hydrocarbons. Fuel-range hydrocarbons obtained from biofeedstocks are often referred to as renewable fuel. As used herein, the term "fuel-range" refers to hydrocarbons with molecules including from 1 carbon to 24 carbons. It is not necessary for the hydrocarbons to contain molecules that encompass the entire range from 1 carbon to 24 carbons to be considered fuel range, but rather contain one or more molecules with a number of carbons in the range.

In accordance with present embodiments, renewable fuel production includes a hydrotreating stage. In the hydrotreating stage, biofeedstocks are converted by reaction with hydrogen, for example, to form normal paraffins in a fuel range with removal of oxygen. Canola oil, for example, typically contains a majority fraction of C18 fatty acids chain with minor components of C16 and C20 fatty acids chain such that hydrotreatment converts canola oil into the corresponding normal paraffins such as n-C17 and n-C18. Normal paraffins typically have poor cold flow properties so example embodiments further include an isomerization stage to isomerize at least a portion of the normal paraffins to branched paraffins. The isomerization stage, in some embodiments, also cracks a portion of the relatively longer hydrocarbon chain paraffins to shorter chain paraffins. An isomerization effluent including fuel-range hydrocarbons is withdrawn from the isomerization stage, wherein the fuel-range hydrocarbons include the branched paraffins.

While this process can be used to produce fuel-range hydrocarbons for renewable fuels, biofeedstocks contain oxygenates or other contaminants that can cause fouling and catalyst deactivation in the hydrotreating and isomerization stages. To reduce such problems, biofeedstocks can be pretreated to reduce contaminants, but these pretreated biofeedstocks are often expensive, resulting in the production of renewable fuels that can be cost prohibitive. Moreover, while biofeedstocks of less quality can be used to reduce cost, they often result in too much fouling and increased catalyst deactivation to be suitable replacements for the more heavily pretreated biofeedstocks.

It has been found that by using a low-quality feedstock (e.g., degummed vegetable oil) fouling is significantly reduced. In some embodiments, the low-quality feedstock is blended with a higher quality feedstock (e.g., RBD oil, petroleum feedstock). The fouling potential of blends of the two different quality feedstocks is less than would be expected based on the proportion of blend proponents, indicating that low-quality feedstocks can be used in concentrations that far exceed concentrations that would have been expected to provide undesirable equipment fouling based on the fouling potential of the low-quality feedstock alone. Accordingly, example embodiments co-process feedstocks of different qualities to produce fuel-range hydrocarbons. In accordance with present embodiments, a combined feedstock for producing renewable fuel includes a biofeedstock and an additional feedstock of higher quality than the biofeedstock. In some embodiments, the additional feedstock includes a petroleum feedstock and/or an additional biofeedstock. In some embodiments, the additional feedstock includes a recycle of paraffins product. The biofeedstock and the additional feedstock are of different qualities, in that the biofeedstock has 10 wt. % or more of each of metals, phosphorous, and chlorophyll than the additional feedstock. In some embodiments, two or more low quality feedstocks are blended. In some embodiments, two or more high quality feedstocks are blended.

In some embodiments, the biofeedstock includes the phosphorous in an amount of 300 parts per million ("ppm") or less, the metals in an amount of 300 parts per million ("ppm") or less and the chlorophyll in an amount of 50 ppm or less. For example, the biofeedstock includes metals in an amount of 250 ppm, 200 ppm, 150 ppm, 100 ppm, 50 ppm, 25 ppm, 10 ppm, 5 ppm, or less. By way of further example, the biofeedstock includes phosphorous in an amount of 250 ppm, 200 ppm, 150 ppm, 100 ppm, 50 ppm, 25 ppm, 10 ppm, 5 ppm, or less. By way of further example, the biofeedstock includes chlorophyll in an amount of 50 ppm, 40 ppm, 30 ppm, 20 ppm, 10 ppm, 5 ppm, or less. Any suitable processing technique can be used, as needed, to provide the biofeedstock with the feed specifications, if required. Degumming is one technique that is conventionally used to remove phospholipids from vegetable oils and also provides vegetable oils with reduced impurity levels. In one or more embodiments, the biofeedstock include a degummed oil, such as a degummed vegetable oil. As used herein, the term "degummed oil" or "degummed vegetable oil" refers to an oil that has been processed to remove phospholipids to provide a processed oil with metals in an amount of 200 ppm or less, the phosphorous in an amount of 200 ppm or less, and the chlorophyll in an amount of 30 ppm or less. In one or more embodiments, the biofeedstock include a super degummed oil, such as a super degummed vegetable oil. As used herein, the term "super degummed oil" or "super degummed vegetable oil" refers to an oil that has been processed to remove phospholipids to provide a processed oil with metals in an amount of 100 ppm or less, the phosphorous in an amount of 50 ppm or less, and the chlorophyll in an amount of 30 ppm or less.

In some embodiments, the additional feedstock includes metals in an amount of about 10 ppm or less, phosphorous in an amount of about 10 ppm or less, and chlorophyll in an amount of about 5 ppm or less. For example, the additional feedstock includes metals in an amount of 5 ppm, 2 ppm, or 1 ppm. By way of further example, additional feedstock includes phosphorous in an amount of 5 ppm, 2 ppm, or 1 ppm. By way of further example, the additional feedstock includes chlorophyll in an amount of 4 ppm, 3 ppm, 2 ppm, or 1 ppm. Any suitable processing technique can be used, as needed, to provide the additional feedstock (e.g., a biofeedstock) with the feed specifications, if required. While the specific refining process can vary to provide higher quality biofeedstocks, for example, based on the processed oil and specific requirements, processing typical processing steps include refining, bleaching, and deodorization. As used herein, the term "refined, bleached, and deodorized oil" or "RBD oil" refers to an oil that has been refined, bleached, and deodorized to remove impurities and provide a processed oil with free fatty acids in an amount of 0.05 wt. % or less, metals in an amount of 5 ppm or less, phosphorous in an amount of 2 ppm or less, and chlorophyll in an amount of 1 ppm or less.

The first and additional feedstocks are provided in the combined feedstock in any suitable amount to provide a feed with a desirable fouling potential. In some embodiments, the combined feedstock includes the additional feedstock in an amount about of about 1 wt. % to about 99 wt. % and the biofeedstock in an amount of about 1 wt. % to about 99 wt. %. In some embodiments, the combined feedstock includes the additional feedstock in an amount about of about 25 wt. % to about 99 wt. % and the biofeedstock in an amount of about 1 wt. % to about 75 wt. %. In other embodiments, the combined feedstock includes the additional feedstock in an amount about of about 50 wt. % to about 95 wt. % and the biofeedstock in an amount of about 5 wt. % to about 50 wt. %. In other embodiments, the combined feedstock includes the additional feedstock in an amount about of about 40 wt. % to about 90 wt. % and the biofeedstock in an amount of about 10 wt. % to about 60 wt. %. In some embodiments, the combined feedstock includes the biofeedstock in an amount about of about 25 wt. % to about 99 wt. % and the additional feedstock in an amount of about 1 wt. % to about 75 wt. %. In other embodiments, the combined feedstock includes the biofeedstock in an amount about of about 50 wt. % to about 95 wt. % and the additional feedstock in an amount of about 5 wt. % to about 50 wt. %. In other embodiments, the combined feedstock includes the biofeedstock in an amount about of about 40 wt. % to about 90 wt. % and the additional feedstock in an amount of about 10 wt. % to about 60 wt. %.

The biofeedstock, whether the low quality feedstock or a higher quality feedstock in the additional feedstock, includes any suitable biofeedstock. As used herein, a biofeedstock refers to a feedstock derived from a biological raw material component such as vegetable, animal, fish, and/or algae. Examples of suitable biofeedstocks include, but are not limited to, vegetable oils, animal fats, fish oils, pyrolysis oils, and algae oils, as well as components of such materials, and in some embodiments can specifically include one or more type of lipid compounds. In some embodiments, the biofeedstock and/or additional biofeedstock includes a combination of more than one biofeedstock. In some embodiments, the biofeedstock includes fatty acid methyl ester.

Examples of suitable biofeedstocks include lipid compounds. As used herein, lipid compounds are biological compounds that are insoluble in water, but soluble in nonpolar (or fat) solvents. Non-limiting examples of such solvents include alcohols, ethers, chloroform, alkyl acetates, benzene, and combinations thereof. Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes. In living organisms, lipids generally serve as the basis for cell membranes and as a form of fuel storage. Lipids can also be found conjugated with proteins or carbohydrates, such as in the form of lipoproteins and lipopolysaccharides.

Another example of a suitable biofeedstock includes vegetable oils. Examples of vegetable oils that can be used include rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil, and rice bran oil. Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. In some embodiments, one or more of methyl, ethyl, and propyl esters are used. As previously described, examples of suitable vegetable oils can be characterized as being RBD vegetable oil, degummed vegetable oil, or super degummed vegetable oil.

Another example of a suitable biofeedstock includes animal fats. Examples of animal fats that can be used include, but are not limited to, beef fat (tallow), hog fat (lard), turkey fat, fish fat/oil, and chicken fat. The animal fats can be obtained from any suitable source including restaurants and meat production facilities. Animal fats as referred to herein also include processed animal fat material. Non-limiting examples of processed animal fat material include fatty acids and fatty acid alkyl esters. Alkyl esters typically include $C_1$-$C_5$ alkyl esters. In some embodiments, one or more of methyl, ethyl, and propyl esters are used.

Another example of a suitable biofeedstock includes algae oil, for example, that is typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 weight percent ("wt. %") to 40 wt. % of lipids, based on total weight of the biomass itself. Example algal sources for algae oils include, unicellular and multicellular algae. Examples of such algae include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae is of the classes Chlorophyceae and/or Haptophyta. Examples of specific species include, but are not limited to, *Neochloris oleoabundans, Scenedesmus dimorphus, Euglena gracilis, Phaeodactylum tricornutum, Pleurochrysis camerae, Prymnesium parvum, Tetraselmis chui*, and *Chlamydomonas reinhardtii*. Additional or alternate algal sources include one or more microalgae of the *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Platymonas, Pleurochrysis, Pleurococcus, Prototheca, Pseudochlorella, Pyramimonas, Pyrobotrys, Scenedesmus, Skeletonema, Spyrogyra, Stichococcus, Tetraselmis, Thalassiosira, Viridiella*, and *Volvox* species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema*, and *Xenococcus* species.

Additional examples of the biofeedstocks include a waste stream. Non-limiting examples of suitable waste streams include used cooking oil and animal fat waste.

In some embodiments, one or more additional feedstocks can be used as a co-feed with the biofeedstock. Examples of suitable co-feeds include spent motor oils and industrial lubricants, used paraffin waxes, liquids derived from the gasification of coal, biomass, natural gas followed by a downstream conversion step such as Fischer-Tropsch technology, liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components.

In other embodiments, the additional feedstock includes a petroleum-based feedstock as a co-feed with biofeedstock. Suitable feedstocks include whole and reduced petroleum crudes, cycle oils, gas oils, including vacuum gas oils and coker gas oils, light to heavy distillates including raw virgin distillates, hydrocrackates, hydrotreated oils, extracts, slack waxes, raffinates, and mixtures of these materials.

The hydrotreating and then isomerization of the biofeedstocks of different qualities produce fuel-range hydrocarbons. The fuel-range hydrocarbons in the isomerization effluent generally include branched paraffins. By way of example, the fuel range fuel-range hydrocarbons in the isomerization effluent include branched paraffins in an amount greater than 50 wt. %, 60 wt. %, 80 wt. %, or 90 wt. %. In addition, example embodiments of the hydrotreating and isomerization generate an isomerization effluent with a majority of C4+ hydrocarbons, for example, the isomerization effluent fuel range fuel-range hydrocarbons in the isomerization effluent include hydrocarbons have four carbons are greater in an amount of greater than 70 wt. %, wt. %, 90 wt. %, 95 wt. %, or 99 wt. %.

The isomerization effluent is separated into various fractions, in accordance with one or more embodiments, to obtain streams useful for various applications. For example, the isomerization is separate into various hydrocarbon fractions, including, a liquefied petroleum gas fraction ("LPG") including, a naphtha fraction, a jet range fraction, and/or a diesel fraction. In addition, gaseous components are also separate from the isomerization effluent, in accordance with one or more embodiments. The gaseous components include hydrogen, carbon monoxide, and/or carbon dioxide. In accordance with one or more embodiments, production separation includes several unit operations such as steam stripping, distillation, and quenching, for example, to separate the components of the isomerization effluent into various fractions.

In some embodiments, an LPG fraction is separated from the isomerization effluent. The LPG fraction includes a majority of molecules including from 3 carbons to 4 carbons. The LPG fraction is typically separated from the other hydrocarbon fractions based on boiling point and has a lower boiling point than the naphtha, jet range, and diesel range fractions. The LPG fraction, for example, can be sold as a product and/used in another refinery operation.

In some embodiments, a naphtha fraction is separated from the isomerization effluent. The naphtha fraction includes a majority of molecules including from 5 carbons to 12 carbons. The naphtha fraction is typically separated from the other hydrocarbon fractions based on boiling point and has a lower boiling point than the jet range and diesel range fractions. The naphtha fraction can be sold as a product or reused in another refinery operation. The naphtha fraction, for example, can be sold as a product and/or used as a feedstock in other refinery/petrochemical operations. In some cases, LPG can be blended to naphtha fraction.

In some embodiments, a jet range fraction is separated from the isomerization effluent. The jet range fraction includes a majority of molecules including from 7 carbons to 18 carbons. The jet fraction is typically separated from the other hydrocarbon fractions based on boiling point and has a lower boiling point than the diesel range fraction. The jet range fraction should be suitable for use in preparation of a renewable jet fuel. In particular embodiments, the jet range fraction is used as a blending component for a renewable jet fuel and/or is combined with one or more additives to provide a renewable jet fuel.

In some embodiments, a diesel range fraction is separated from the isomerization effluent. The diesel range fraction includes a majority of molecules including from 12 carbons to 24 carbons. The diesel fraction is typically separated from the other hydrocarbon fractions based on boiling point and has a higher boiling point than the LPG, naphtha, and jet range fractions. The diesel range fraction should be suitable for use in preparation of a renewable diesel fuel. In particular embodiments, the diesel range fraction is used as a blending component for a renewable diesel fuel and/or is combined with one or more additives to provide a renewable diesel fuel. In some embodiments, a jet range fraction can be included in the diesel range fraction.

FIG. 1 is a simplified block diagram illustrating a system 10 for renewable fuel production in accordance with some embodiments. As illustrated, embodiments of the system 10 include a hydrotreating stage 12 and an isomerization stage 14. The hydrotreating stage 12 receives a combined feedstock stream 16 containing a biofeedstock and an additional feedstock of different quality that are reacted with hydrogen from a hydrogen stream 18 to form a hydrotreatment effluent 20 including normal paraffins in a fuel range with molecules including from 1 carbon to 24 carbons. As illustrated, the isomerization stage 14 receives hydrotreatment effluent 20 and isomerizes at least a portion of the normal paraffins to form branched paraffins in an isomerization effluent 22.

In the hydrotreating stage 12, the feedstocks and the hydrogen react in the presences of a hydrogenation catalyst at effective hydrotreating conditions to produce reaction products including normal paraffins. As previously described, the biofeedstock has about 10 wt. % or more of each of phosphorous, metals, and chlorophyll than the additional feedstock. Even further, embodiments of the biofeedstock include the metal content in an amount of about 200 parts per million ("ppm") or less, the phosphorous in an amount of about 200 parts per million ("ppm") or less, and the chlorophyll in an amount of about 30 ppm or less. The biofeedstock and additional feedstock are alternatively separately introduced into the hydrotreating stage 12. In the hydrotreating stage 12, a number of different reactions occur, including, for example, hydrogenation, decarboxylation, decarbonylation, and/or hydrodeoxygenation. In hydrogenation reactions, olefinic compounds are saturated by addition of hydrogen. In decarboxylation reactions, oxygen is removed as carbon dioxide. In decarbonylation reactions, oxygen is removed as carbon monoxide. In hydrodeoxygenation reactions, oxygen is removed as water. Cracking reactions can also occur in the hydrotreating stage 12 in which larger molecules (e.g., hydrocarbons) are broken down into shorter-chain molecules. Accordingly, in addition to normal paraffins, additional reaction products formed in the hydrotreating stage 12 include water and carbon oxides such that the hydrotreatment effluent 20 includes normal paraffins, water, and carbon oxides. While not shown on FIG. 1, example embodiments further include separating the generated water, carbon monoxide, and carbon dioxide from the normal paraffins prior to isomerization. In addition, example embodiments also include separation of hydrogen from the hydrotreatment effluent for recycle.

In accordance with one or more embodiments, the hydrotreating stage 12 includes a hydrotreating catalyst. In some embodiments, the hydrotreating catalyst serves a dual function as having both hydrogenation and cracking sites to break longer carbon chains to shorter carbon chains and/or to remove hetero atoms and selectively saturate olefins. Hydrotreating catalysts typically include a Group VIII and Group VIB metal hydrogenating component on a zeolite, amorphous silica aluminate, or alumina base. Examples of suitable zeolite bases include molecular sieves, and are generally composed of silica, alumina, and one or more exchangeable cations such as sodium, magnesium, calcium, and/or rare earth metals. Examples of molecular sieves suitable for the present process include crystal pores of relatively uniform diameter between 4 and 50 Angstroms. In some embodiments, the molecular sieves include zeolites such as mordenite, clinoptilolite, ferrierite, dachiardite, chabazite, erionite, faujasite, Beta, X, Y, L, ZSM-5, ZSM-48, ZSM-23, ZSM-11 and MCM-22, for example. Non-limiting examples of metals for the hydrotreating catalysts include iron, cobalt, nickel, molybdenum, tungsten, ruthenium, rhodium, palladium, osmium, iridium, and platinum, and combination thereof. Where present, the hydrotreating catalyst includes metal in any suitable amount such as from 0.05 wt. % to 30 wt. %, based on the total weight of the hydrotreating catalyst. In some embodiments, the hydrotreating catalyst includes metal in an amount of 0.3 wt. % or more, 0.5 wt. % or more, 1.0 wt. % or more, 2.0 wt. % or more, 2.5 wt. % or more, 3.0 wt. % or more, or 5.0 wt. % or more.

In accordance with one or more embodiments, hydrotreating is performed by exposing the biofeedstock and hydrogen to a hydrotreating catalyst under effective hydrotreating conditions. Examples of effective hydrotreating conditions include, but are not limited to, temperatures from 200° to 425° C., from 220° to 330° C., from 245° to 315° C., or from 260 ° C. to 285 ° C. Additional examples of effective hydrotreating conditions include, but are not limited to, a pressure of 1.3 MPag to 30 Mpag, 1.3 MPag to 5 MPag, 5 MPag to 10 MPag, 10 MPag to 20 MPag, or 20 MPag to 30 MPag. Additional examples of hydrotreating conditions include, but are not limited to, liquid hourly space velocity from 0.2 to 10 V/V/Hr, 1 to 5 V/V/Hr, or 5 to 10 V/V/Hr. While not shown on FIG. 1, at least a portion of the hydrotreatment effluent 20 is recycled to the hydrotreating stage 12 in particular embodiments.

In the isomerization stage 14, at least a portion of the normal paraffins in the hydrotreatment effluent 20 are catalytically isomerizing, in one or more embodiments, to produce branched paraffins in an isomerization effluent 22. By isomerization, the resultant branched paraffins and thus resultant products have improved cold flow properties, such as freezing point. Catalytic isomerization relates to the isomerization of the normal paraffins from the hydrotreating stage 12. In some embodiments, catalytic isomerization is accomplished by hydroisomerization of the normal paraffins. In some embodiments, cracking in the isomerization stage is minimized to minimize yield loss to light products, for example, by using selected zeolite, such as, ZSM-48. While not shown on FIG. 1, at least a portion of the isomerization effluent 22 is recycled to the hydrotreating stage 12 and/or the isomerization stage 14 in particular embodiments. Alternatively, at least a portion of the hydrotreatment effluent 20 is recycled to the hydrotreating stage 12. In some embodiments, heavier hydrocarbons, for example, C12-C24 hydrocarbons are fully or partially recycled back to the hydrotreating stage 12 to maximize product of other hydrocarbons, such as jet-range hydrocarbons. In some embodiments, the isomerization effluent 22 contains gases including, for example, hydrogen or other gases generated in the isomerization stage, which can be separated and fully or partially recycled back.

In accordance with one or more embodiments, the isomerization stage 14 includes an isomerization catalyst. In some embodiments, the isomerization catalyst includes molecular sieves such as crystalline aluminosilicates (zeolites) and/or silicoaluminophosphates (SAPOs). For example, suitable molecular sieves include a 1-D or 3-D molecular sieve. By way of further example, suitable molecular sieves include a 10-member ring 1-D molecular sieve (e.g., ZSM-48). Examples of molecular sieves include, but are not limited to, ZSM-48, ZSM-23, ZSM-35, Beta, USY, ZSM-5, and combinations thereof. In an embodiment, the molecular sieve includes ZSM-48, ZSM-23, or a combination thereof. The isomerization catalyst optionally includes a binder, such as alumina, titania, silica, silica-alumina, zirconia, or a combination thereof. In an embodiment, the binder includes or be alumina, titania, or a combination thereof. In another embodiment, the binder includes or be titania, silica, zirconia, or a combination thereof.

In some embodiments, the isomerization catalyst also includes a metal component, such as a Group VIII metal. Suitable Group VIII metals can include, but are not limited to, Pt, Pd, Ni, and combinations thereof. In some embodiments, the isomerization catalyst includes a metal in an amount of 0.1 wt. % to 10 wt. %, including 0.3 wt. % to 7 wt. %, 0.5 wt. % to 5 wt. %, or 1 wt. % to 5 wt. %. In some embodiments, particularly when Group VIII metal is a non-noble metal such as Ni, the isomerization catalyst additionally includes a Group VIB metal, such as W and/or Mo. For instance, in one embodiment, the isomerization catalyst includes Ni and W, Ni and Mo, or a combination of Ni, Mo, and W. In certain such embodiments, the isomerization catalyst can include 0.5 wt. % or more of the Group VIB metal, for example, 0.5 wt. % to 20 wt. %, 1 wt. % to 12 wt. %, or 1 wt. % to 10 wt. %. In one particular embodiment, the isomerization catalyst includes a Group VIII metal selected from Pt, Pd, and a combination thereof.

Catalytic isomerization can be performed by exposing at least a portion of the normal paraffins from the hydrotreatment effluent 20 to an isomerization catalyst under effective isomerization conditions. Effective isomerization conditions can include, but are not limited to, a temperature of 260° C. or higher, for example, 285° C. or higher, 315° C. or higher, or 340° C. or higher. Additionally, or alternately, the temperature can be 400° C. or less, for example 371° C. or less, or 340° C. or less. In some embodiments, the temperature is in a range from 260° C. to 400° C. Effective isomerization conditions can additionally or alternatively include, but are not limited to, a total pressure of 1.3 MPag or more, for example, 1.7 Mpag or more, 3.4 MPag or more, 5.2 MPag or more, or 6.9 MPag or more. Additionally or alternatively, the total pressure can be 10.3 MPag or less, for example 8.2 MPag or less, 6.9 MPag or less, or 5.5 MPag or less. In some embodiments, the total pressure is from 1.3 MPag to 10.3 MPag.

Figure 2:
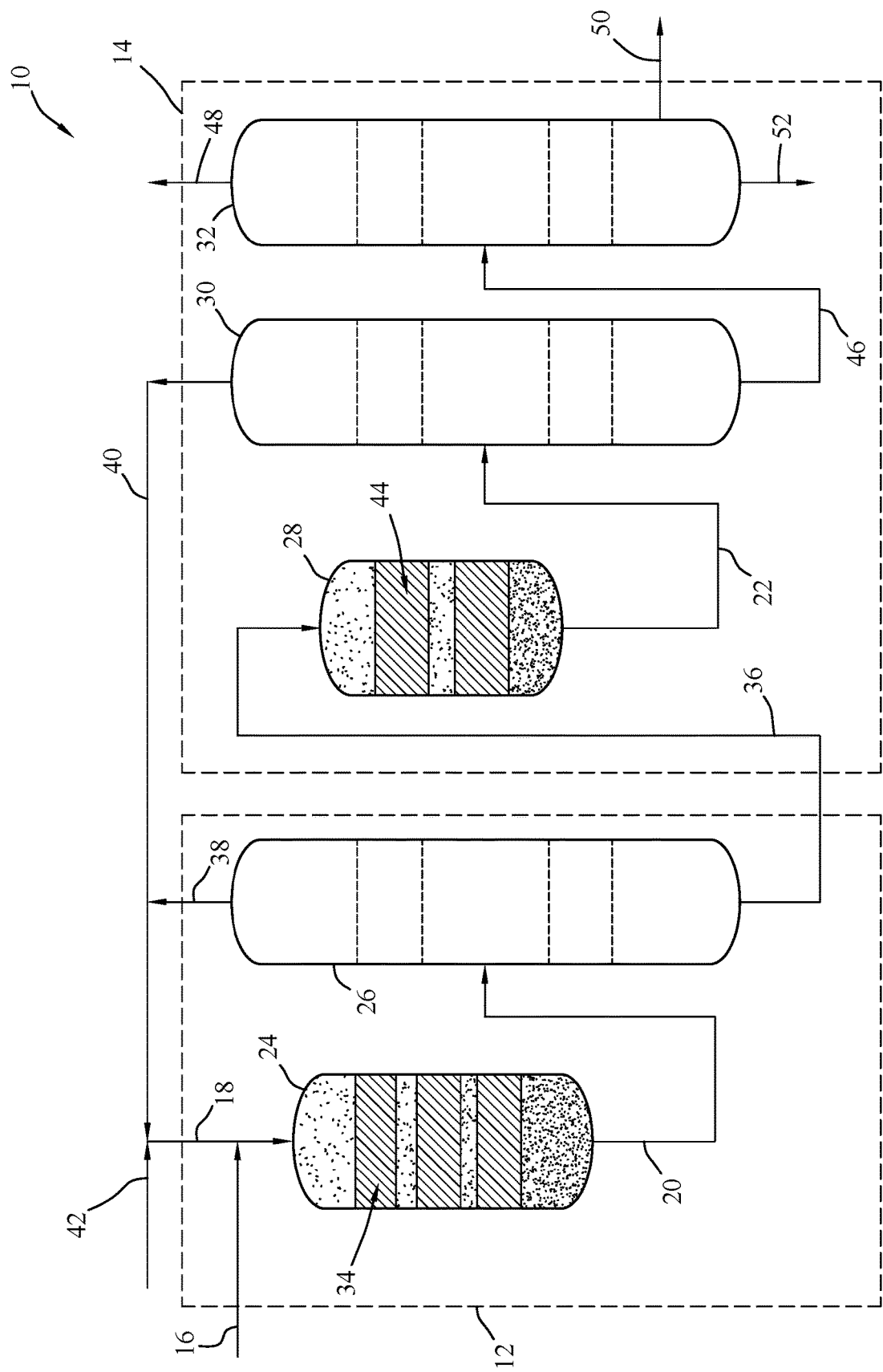
FIG. 2 is a schematic illustration of a process for producing renewable fuels from biofeedstocks in accordance with one or more embodiments.

FIG. 2 illustrates an example of the system 10 for renewable fuel production in accordance with some embodiments. In the illustrated embodiments, the system 10 includes the hydrotreating stage 12 and the isomerization stage 14. In some embodiments, the hydrotreating stage 12 includes a hydrotreating reactor 24 and a hydrotreating separator 26. As illustrated, the isomerization stage 14 includes, for example, an isomerization reactor 28, an isomerization separator 30, and a product separator 32. In some embodiments, a combined feedstock stream 16 including a biofeedstock and an additional feedstock of different qualities and a hydrogen stream 18 including hydrogen can be combined and introduced into the hydrotreating reactor 24. However, it should be understood that these streams are alternatively separately introduced to the hydrotreating reactor 24. In addition, the biofeedstock and the additional feedstock optionally are separately introduced into the hydrotreating reactor 24 instead of being introduced in a single stream. In the hydrotreating reactor 24, the feedstocks and hydrogen react, in accordance with one or more embodiments, in the presence of a hydrotreating catalyst 34 to produce a hydrotreatment effluent 20. The hydrotreatment in the hydrotreating reactor 24 is discussed in the preceding sections. In the illustrated embodiments, the hydrotreatment effluent 20 flows from the hydrotreating reactor 24 into a hydrotreating separator 26 for separation of the gas-phase products from the liquid-phase products. In some embodiments, the liquid-phase products including normal paraffins are withdrawn from the hydrotreating separator 26 as normal paraffin stream 36. In some embodiments, the gas-phase products are withdrawn from the hydrotreating separator 26 as hydrotreating gas stream 38. As illustrated, the hydrotreating gas stream 38 is combined with the isomerization gas stream 40 from the isomerization separator 30 to form the hydrogen stream 18 fed to the hydrotreating reactor 24 in accordance with one or more embodiments. If needed, makeup hydrogen stream 42 is also be combined into the hydrogen stream 18. While not shown on FIG. 2, at least a portion of the hydrotreatment effluent 20 is recycled to the hydrotreating stage 12 in particular embodiments.

In the illustrated embodiment, the normal paraffin stream 36 including normal paraffins is introduced into the isomerization stage 14. For example, the normal paraffin stream 36 is introduced into isomerization reactor 28. While not shown, make-up hydrogen is also added to the isomerization reactor 28 in accordance with one or more embodiments. In the isomerization stage 14, the hydrotreated biofeedstock reacts, in accordance with one or more embodiments, in the presence of an isomerization catalyst 44 to form an isomerization effluent 22. The isomerization that occurs in the isomerization reactor 28 is discussed in the preceding sections. Embodiments include introduction of the isomerization effluent 22 into an isomerization separator 30 for separation of the gas-phase products from the liquid-phase products. In the illustrated embodiment, the gas-phase products are withdrawn from the isomerization separator 30 as isomerization gas stream 40 and combined with the hydrotreating gas stream 38 for recycle to the hydrotreating reactor 24. In the illustrated embodiments, the liquid-phase products are withdrawn from the isomerization separator 30 as isomerization separator bottoms 46 which are then introduced into product separator 32, for example. Although shown as one unit, product separator 32 may include several unit operations such as steam stripping, distillation, and quenching, for example, to separate the hydrocarbons in the isomerization separator bottoms 46 into various fractions, including, but not limited to, LPG, naphtha, jet range, and/or diesel range fractions. In the illustrated embodiments, isomerization separator bottoms 46 is separated into a naphtha fraction 48, jet range fraction 50, and a diesel range fraction 52. While not shown on FIG. 2, at least a portion of the diesel range fraction 52 optionally are recycled to the hydrotreating reactor 24 and/or the isomerization reactor 28 if desired for increased yield of jet range hydrocarbons, for example.

Figure 3:
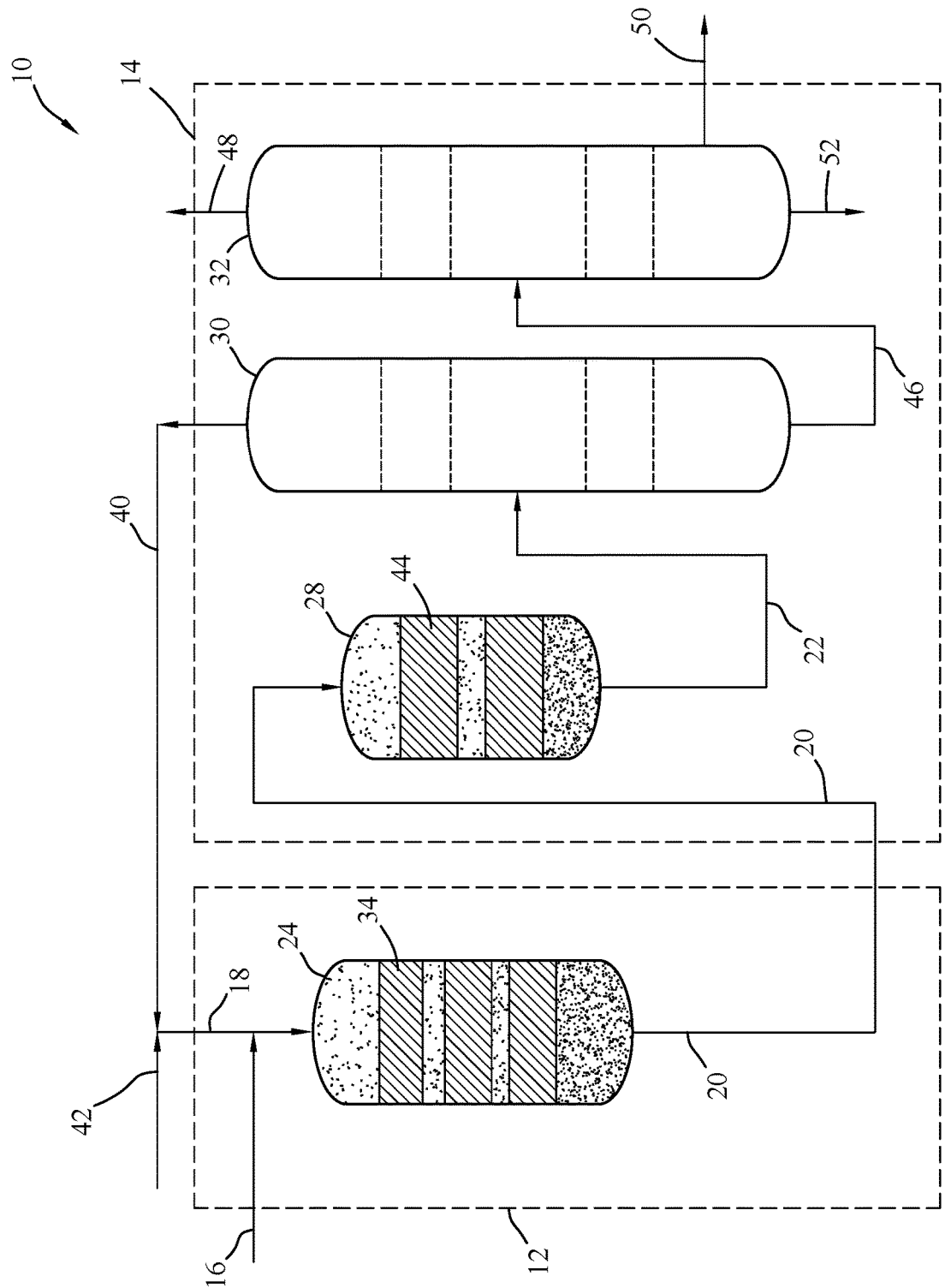
FIG. 3 is a schematic illustration of another process for producing renewable fuels from biofeedstocks in accordance with one or more embodiments.

FIG. 3 illustrates another example of the system 10 for renewable fuel production in accordance with some embodiments. As illustrated, embodiments of the system 10 include the hydrotreating stage 12 and the isomerization stage 14. In contrast to the embodiment shown on FIG. 2, the illustrated embodiment does not include a separator (e.g., hydrotreating separator 26 on FIG. 2) between the hydrotreating stage 12 and the isomerization stage 14. In the illustrated embodiment, the combined feedstock stream 16 including a biofeedstock and an additional feedstock having different qualities and the hydrogen stream 18 including hydrogen are combined and introduced into the hydrotreating reactor 24. However, it should be understood that these streams are optionally separately introduced to the hydrotreating reactor 24. In addition, the biofeedstock and additional feedstock are also separately introduced to the hydrotreating reactor 24 from one another in accordance with alternative embodiments. In the hydrotreating reactor 24, the feedstocks and hydrogen react, in accordance with one or more embodiments, in the presence of a hydrotreating catalyst 34 to produce a hydrotreatment effluent 20. The hydrotreatment in the hydrotreating reactor 24 is discussed in the preceding sections.

In the illustrated embodiment, the hydrotreatment effluent 20 including hydrotreated biofeedstock flows from the hydrotreating reactor 24 to the isomerization stage 14. For example, the hydrotreatment effluent 20 is flowed from the hydrotreating reactor 24 to the isomerization reactor 28 without intervening separation. While not shown, make-up hydrogen is also added to the isomerization reactor 28 in accordance with one or more embodiments. In the isomerization stage 14, the normal paraffins in the hydrotreatment effluent 20 react, in accordance with one or more embodiments, in the presence of an isomerization catalyst 44 to form branched paraffins in an isomerization effluent 22. The isomerization that occurs in the isomerization reactor 28 is discussed in the preceding sections. In the illustrated embodiment, the isomerization effluent 22 is introduced into an isomerization separator 30 for separation of the gas-phase products from the liquid-phase products. In the illustrated embodiments, the gas-phase products are withdrawn from the isomerization separator 30 as isomerization gas stream 40 and combined with makeup hydrogen stream 42, for example, for recycle to the hydrotreating reactor 24. In the illustrated embodiment, the liquid-phase products are withdrawn from the isomerization separator 30 as isomerization separator bottoms 46 which is introduced into product separator 32, for example. Although shown as one unit, product separator 32 may include several unit operations such as steam stripping, distillation, and quenching, for example, to separate the hydrocarbons in the isomerization separator bottoms 46 into various fractions, including, but not limited to, LPG, naphtha, jet range, and/or diesel range fractions. In the illustrated embodiments, isomerization separator bottoms 46 is separated into a naphtha fraction 48, jet range fraction 50, and a diesel range fraction 52. While not shown on FIG. 3, at least a portion of the diesel range fraction 52 are optionally recycled to the hydrotreating reactor 24 and/or the isomerization reactor 28 if desired for increased yield of jet range hydrocarbons, for example.

Figure 4:
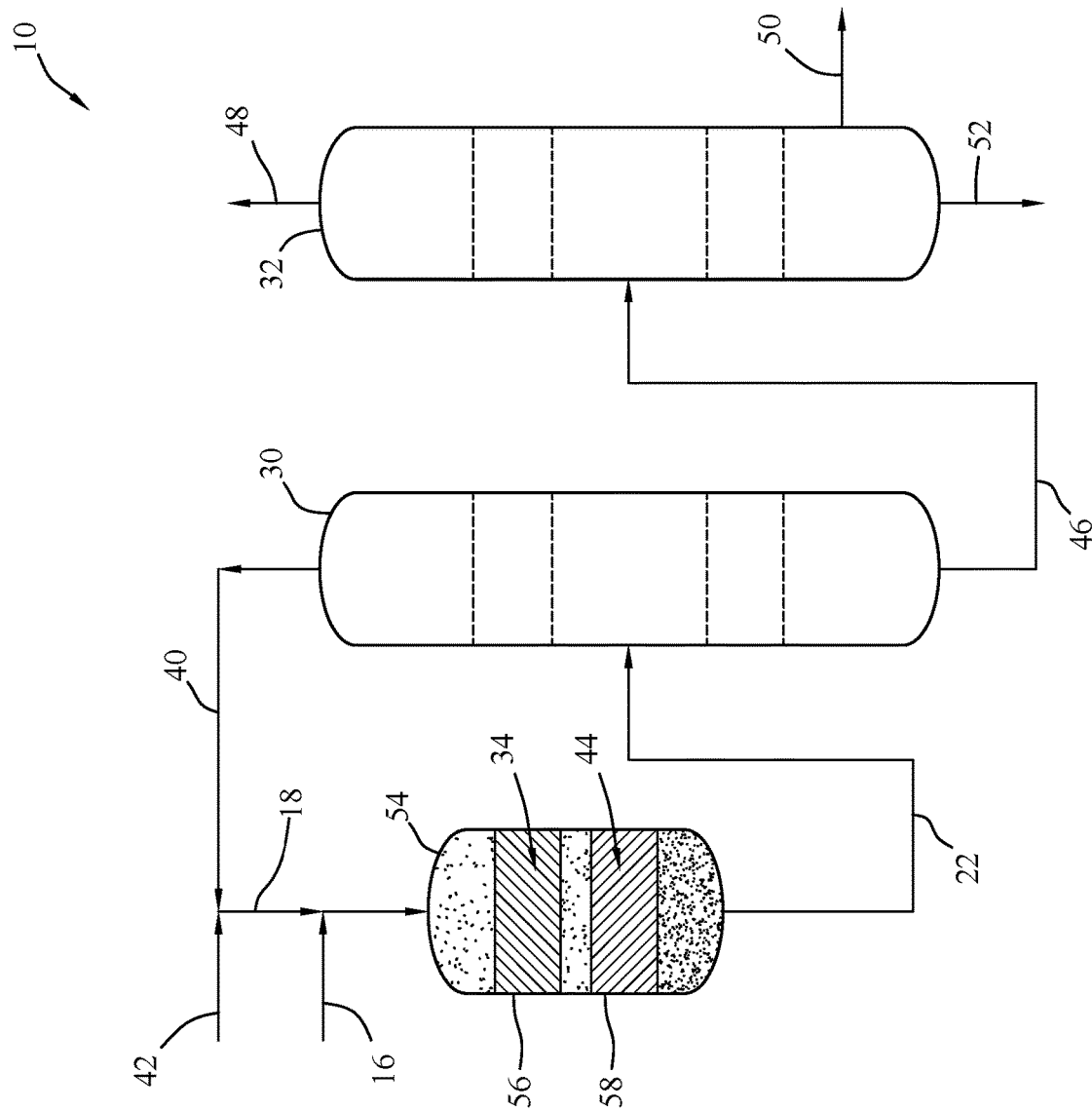
FIG. 4 is a schematic illustration of another process for producing renewable fuels from biofeedstocks in accordance with one or more embodiments.

FIG. 4 illustrates another example of the system 10 for renewable fuel production in accordance with some embodiments. As illustrated, embodiments of the system 10 include a common reactor 54 with the hydrotreating catalyst 34 and the isomerization catalyst 44. In contrast to the embodiments shown on FIGS. 2 and 3, the illustrated embodiment includes integration of the hydrotreating and isomerization into the common reactor 54. In the illustrated embodiment, the common reactor 54 includes both the hydrotreating catalyst 34 and the isomerization catalyst 44 in hydrotreating catalyst bed 56 and isomerization catalyst bed 58, respectively. As illustrated, the embodiments of the isomerization catalyst 44 in the isomerization catalyst bed 58 are stacked after the hydrotreating catalyst 34 in the hydrotreating catalyst bed 56. In the illustrated embodiments, the combined feedstock stream 16 including a biofeedstock and additional feedstock having different qualities and the hydrogen stream 18 including hydrogen are combined and introduced into the common reactor 54. However, it should be understood that these streams are optionally separately introduced to the common reactor 54. In addition, the biofeedstock and additional feedstock optionally are separately introduced to the common reactor 54. In the common reactor 54, the feedstocks and the hydrogen react, in accordance with one or more embodiments, in the presence of a hydrotreating catalyst 34 to produce reaction products that further react in the presence of the isomerization catalyst 44.

In the illustrated embodiment, the isomerization effluent 22 is withdrawn from the common reactor 54 and introduced into an isomerization separator 30 for separation of the gas-phase products from the liquid-phase products. In the illustrated embodiment, the gas-phase products are withdrawn from the isomerization separator 30 as isomerization gas stream 40 and combined with makeup hydrogen stream 42, for example, for recycle to the hydrotreating reactor 24. In the illustrated embodiment, the liquid-phase products are withdrawn from the isomerization separator 30 as isomerization separator bottoms 46 which are introduced, for example, into product separator 32. Although shown as one unit, product separator 32 may include several unit operations such as steam stripping, distillation, and quenching, for example, to separate the hydrocarbons in the isomerization separator bottoms 46 into various fractions, including, but not limited to, LPG, naphtha, jet range, and/or diesel range fractions. In the illustrated embodiments, isomerization separator bottoms 46 is separated into a naphtha fraction 48, jet range fraction 50, and a diesel range fraction 52. While not shown on FIG. 4, at least a portion of the diesel range fraction 52 are optionally recycled to the hydrotreating reactor 24 and/or the isomerization reactor 28 if desired for increased yield of jet range hydrocarbons, for example.

Figure 5:
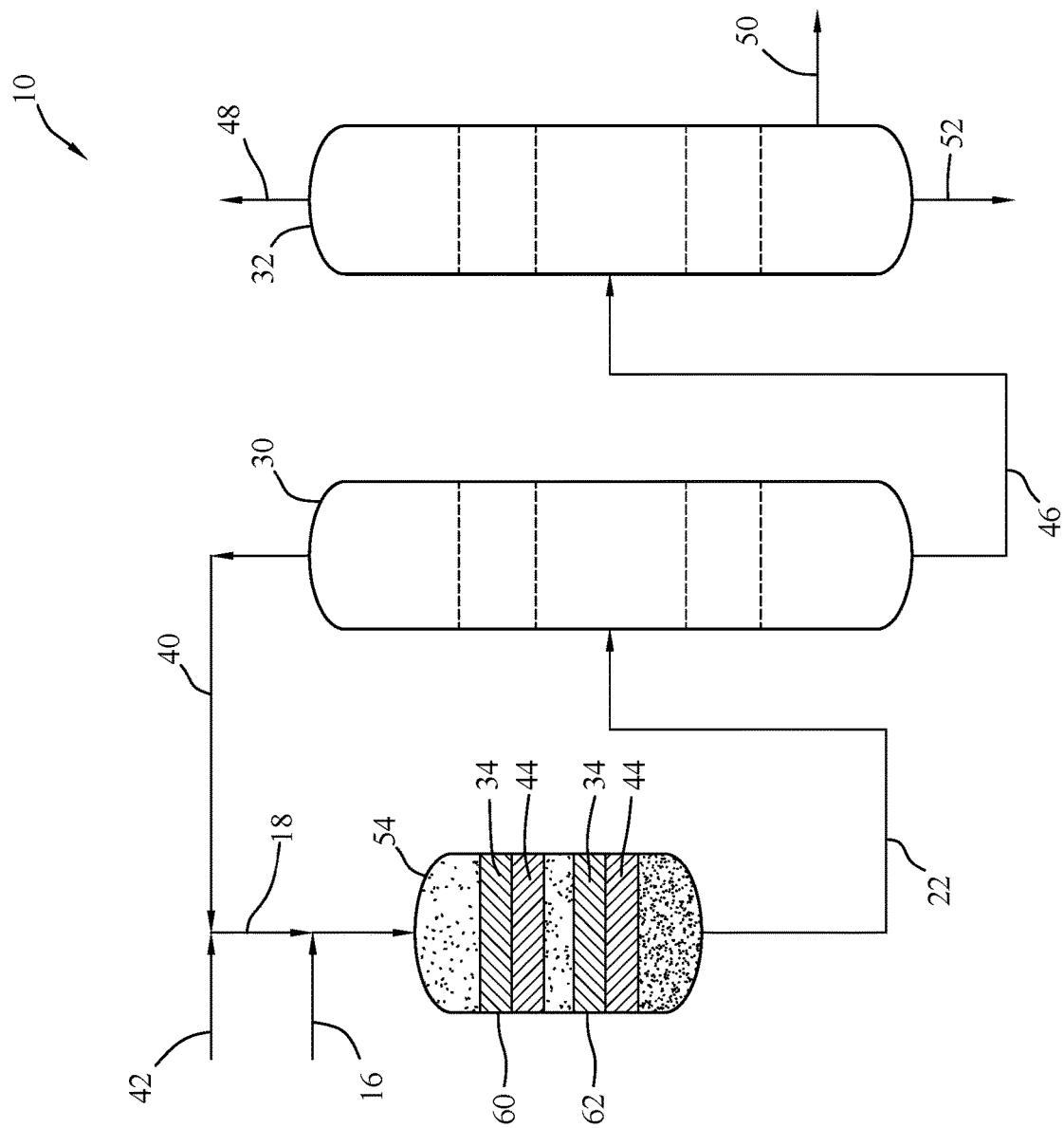
FIG. 5 is a schematic illustration of another process for producing renewable fuels from biofeedstocks in accordance with one or more embodiments.

FIG. 5 illustrates another example of the system 10 for renewable fuel production in accordance with some embodiments. As illustrated, embodiments of the system 10 include a common reactor 54 with the hydrotreating catalyst 34 and the isomerization catalyst 44. In contrast to the embodiments shown on FIG. 4, the hydrotreating catalyst 34 and isomerization catalyst 44 are in the same catalyst beds, e.g., first catalyst bed 60 and second catalyst bed 62. In the illustrated embodiment, the common reactor 54 includes the first catalyst bed 60 containing both hydrotreating catalyst 34 and the isomerization catalyst 44. In some embodiments, the common reactor 54 further includes the second catalyst bed 62 containing both the hydrotreating catalyst 34 and the isomerization catalyst 44. As illustrated, embodiments of the isomerization catalyst 44 in the first and second catalyst beds 60, 62 are stacked after the hydrotreating catalyst 34. In the illustrated embodiment, the combined feedstock stream 16 including a biofeedstock and additional feedstock having different qualities and the hydrogen stream 18 including hydrogen are combined and introduced into the common reactor 54. However, it should be understood that these streams optionally are separately introduced to the common reactor 54. In addition, the biofeedstock and additional feedstock optionally are separately introduced to the common reactor 54. In the common reactor 54, feedstocks and the hydrogen react, in accordance with one or more embodiments, in the presence of a hydrotreating catalyst 34 to produce reaction products that further react, in accordance with one or more embodiments, in the presence of the isomerization catalyst 44.

In the illustrated embodiments, the isomerization effluent 22 is withdrawn from the common reactor 54 and introduced into an isomerization separator 30 for separation of the gas-phase products from the liquid-phase products. In the illustrated embodiment, the gas-phase products are withdrawn from the isomerization separator 30 as isomerization gas stream 40 and combined with makeup hydrogen stream 42, for example, for recycle to the hydrotreating reactor 24. In the illustrated embodiment, the liquid-phase products are withdrawn from the isomerization separator 30 as isomerization separator bottoms 46 which are introduced, for example, into product separator 32. Although shown as one unit, product separator 32 may include several unit operations such as steam stripping, distillation, and quenching, for example, to separate the hydrocarbons in the isomerization separator bottoms 46 into various fractions, including, but not limited to, LPG, naphtha, jet range, and/or diesel range fractions. In the illustrated embodiments, isomerization separator bottoms 46 is separated into a naphtha fraction 48, jet range fraction 50, and a diesel range fraction 52. While not shown on FIG. 5, at least a portion of the diesel range fraction 52 are optionally recycled to the hydrotreating reactor 24 and/or the isomerization reactor 28 if desired for increased yield of jet range hydrocarbons, for example.

ADDITIONAL EMBODIMENTS

Accordingly, the present disclosure provides methods and systems for production of renewable fuels using lower quality feedstocks. The methods and systems may include any of the various features disclosed herein, including one or more of the following statements.

Embodiment 1. A method of producing renewable fuels, comprising: hydrotreating a biofeedstock by contacting reactants comprising a combined feedstock and hydrogen with a hydrotreating catalyst to produce normal paraffins, wherein the combined feedstock comprises a biofeedstock and an additional feedstock; wherein the biofeedstock has about 10 wt. % or more of each of metals, phosphorous, and chlorophyll than the additional feedstock; and wherein the biofeedstock comprises the metals in an amount of about 300 parts per million ("ppm") or less, the phosphorous in an amount of about 300 ppm or less, and the chlorophyll in an amount of about 50 ppm or less; and isomerizing at least a portion of the normal paraffins to produce branched paraffins in an isomerization effluent.

Embodiment 2. The method of Embodiment 1, wherein the hydrotreating catalyst comprises at least one metal selected from the group consisting of a Group VIII metal, a Group VIB metal, and a combination thereof, and wherein the isomerizing is done in the presence of an isomerization catalyst comprising a Group VIII metal.

Embodiment 3. The method of Embodiment 1 or Embodiment 2, wherein the additional feedstock is an additional biofeedstock comprising the metals in an amount of about 10 ppm or less, the phosphorous in an amount of about 10 ppm or less, and the chlorophyll in an amount of about 5 ppm or less.

Embodiment 4. The method of Embodiment 3, wherein the biofeedstock comprises the metals in an amount of 200 ppm or less, the phosphorous in an amount of about 200 ppm or less, and the chlorophyl in an amount of about 30 ppm or less.

Embodiment 5. The method of Embodiment 4, wherein the biofeedstock comprises the metals in an amount of about 50 ppm or less, and wherein the biofeedstock comprises the phosphorous in an amount of about 50 ppm or less.

Embodiment 6. The method of any preceding Embodiment, wherein the additional feedstock comprises refined, bleached, and deodorized vegetable oil comprising the metals in an amount of 10 ppm or less, the phosphorous in an amount of about 2 ppm or less, and the chlorophyll in an amount of about 1 ppm or less, and wherein the biofeedstock comprises degummed vegetable oil comprising the metals in an amount of about 200 ppm or less, the phosphorous in an amount of about 200 ppm or less, and the chlorophyll in an amount of about 30 ppm or less.

Embodiment 7. The method of any preceding Embodiment, wherein the additional feedstock comprises a petroleum feedstock.

Embodiment 8. The method of any preceding Embodiment, wherein the combined feedstock comprises the biofeedstock in an amount about of about 1 wt. % to about 99 wt. % and the additional feedstock in an amount of about 1 wt. % to about 99 wt. %.

Embodiment 9. The method of any preceding Embodiment, wherein the combined feedstock comprises the biofeedstock in an amount about of about 40 wt. % to about 90 wt. % and the additional feedstock in an amount of about 10 wt. % to about 60 wt. %.

Embodiment 10. The method of any preceding Embodiment, further comprising combining the additional feedstock and the biofeedstock to form the combined feedstock and then introducing the combined feedstock into a hydrotreating reactor.

Embodiment 11. The method of Embodiment 10, wherein the combined feedstock further comprises an additional feedstock comprising metals in an amount of about 10 ppm or less, phosphorous in an amount of about 10 ppm or less, and chlorophyll in an amount of about 5 ppm or less.

Embodiment 12. The method of any preceding Embodiment, further comprising separating the at least a portion of the paraffins from a reaction product of the hydrotreating.

Embodiment 13. The method of any preceding Embodiment, further comprising recycling a portion of the paraffins from a reaction product of the hydrotreating to the hydrotreating the biofeedstock, wherein the additional feedstock comprises the portion of the paraffins.

Embodiment 14. The method of any preceding Embodiment, further comprising separating at least a jet range fraction from the isomerization effluent.

Embodiment 15. The method of any preceding Embodiment, further comprising separating at least a diesel range fraction from the isomerization effluent.

Embodiment 16. The method of any preceding Embodiment, further comprising separating at least a diesel range fraction and a jet range fraction from the isomerization effluent.

Embodiment 17. The method of any preceding Embodiment, further comprising separating at least a gaseous component comprising hydrogen from the isomerization effluent.

Embodiment 18. The method of any preceding Embodiment, further comprising separating at least a naphtha fraction from the isomerization effluent.

Embodiment 19. A method of producing renewable fuels, comprising: hydrotreating a biofeedstock by contacting reactants comprising a combined feedstock and hydrogen with a hydrotreating catalyst to produce normal paraffins, wherein the combined feedstock comprises a first vegetable oil and a second vegetable oil; wherein the first vegetable oil is present in an amount of about 50 wt. % or less; wherein the second vegetable oil has about 10 wt. % or more of each of metals, phosphorous, and chlorophyll than the biofeedstock; wherein the second vegetable oil comprises the metals in an amount of about 200 ppm or less, the phosphorous in an amount of 200 ppm or less, and the chlorophyll in an amount of about 30 ppm or less; and wherein the first vegetable oil comprises the metals in an amount of about 10 ppm or less, the phosphorous in an amount of about 2 ppm or less, and the chlorophyll in an amount of about 1 ppm or less; isomerizing at least a portion of the normal paraffins to produce branched paraffins in an isomerization effluent; and separating at least a jet range fraction and a diesel range fraction from the isomerization effluent.

Embodiment 20. The method of Embodiment 19, wherein the first vegetable oil comprises refined, bleached, and deodorized canola oil, and wherein the second vegetable oil comprises degummed canola oil.

Embodiment 21. The method of Embodiment 19 or Embodiment 20, wherein the second vegetable oil is present in an amount of about 25 wt. % or less.

Embodiment 22. The method of any one of Embodiments 19 to 21, further comprising separating at least a gaseous component comprising hydrogen from the isomerization effluent.

To facilitate a better understanding of the present disclosure, the following examples of certain aspects of some embodiments are given. In no way should the following examples be read to limit, or define, the entire scope of the present disclosure.

EXAMPLES

A series of tests were conducted on two canola oil samples having different qualities to illustrate reactor fouling. The canola oil samples were RBD canola oil and super degummed ("SD") canola oil. The fouling potential of the canola oil samples were evaluated using an Alcor HLPS (Hot Liquid Process Simulator) testing apparatus. The canola oil samples were tested in their neat form, as well as blends thereof as follows:
1. Canola Oil Sample 1 (Comparative): RBD Canola Oil
2. Canola Oil Sample 2 (Comparative): SD Canola Oil
3. Canola Oil Sample 3: 75 wt. % SD Canola Oil and 25 wt. % RBD Canola Oil
4. Canola Oil Sample 3: 50 wt. % SD Canola Oil and 50 wt. % RBD Canola Oil

TABLE 1

|  | Total Metals, wppm | P, wppm |
|---|---|---|
| SD Canola oil | 43 | 42 |
| RBD Canola oil | 2.1 | <0.7 |

The testing apparatus includes a reservoir containing a feed supply of the canola oil sample. The canola oil sample was heated to a temperature of approximately 150° C. and then fed into a shell containing a vertically oriented heat exchanger tube. The heat exchange tube was electrically heated to a surface temperature of 370° C. and maintained at such temperature during the test. The canola oil sample was pumped across the heat exchanger tube at a flow rate of approximately 3 mL/minute. The spent canola oil sample was collected in the top section of the reservoir. The spent canola oil sample was separated from the untreated canola oil sample by a sealed piston, thereby allowing for once-through operation. The system was pressurized with nitrogen (800 psig) to ensure gases remain dissolved in the canola oil sample during the test. The test was carried out for 180 minutes during which time thermocouple readings were recorded for the bulk fluid inlet ($T_i$) to the shell and bulk fluid outlet temperatures ($T_f$) from the shell.

During the constant surface temperature testing, foulant deposits and builds up on the heated surface of the heat exchanger tube. The foulant deposits are in some cases thermally degraded to coke. The deposits induces an insulating effect that reduces the efficiency and/or ability of the tube surface to heat the canola oil sample passing across it.

If there is no fouling across the tube surface, the difference between $T_i$ and $T_f$ will unchanged. In the event that fouling of the tube surface occurs, the difference $T_i$ and $T_f$ will decrease as the fouling layer impedes the transfer of heat from the heat exchanger tube to the canola oil sample as it passes across the heat exchanger tube. The temperature difference $T_f$-$T_i$ ($\Delta T$) is the primary indicator of foulant on the heat exchanger tube.

Figure 6:
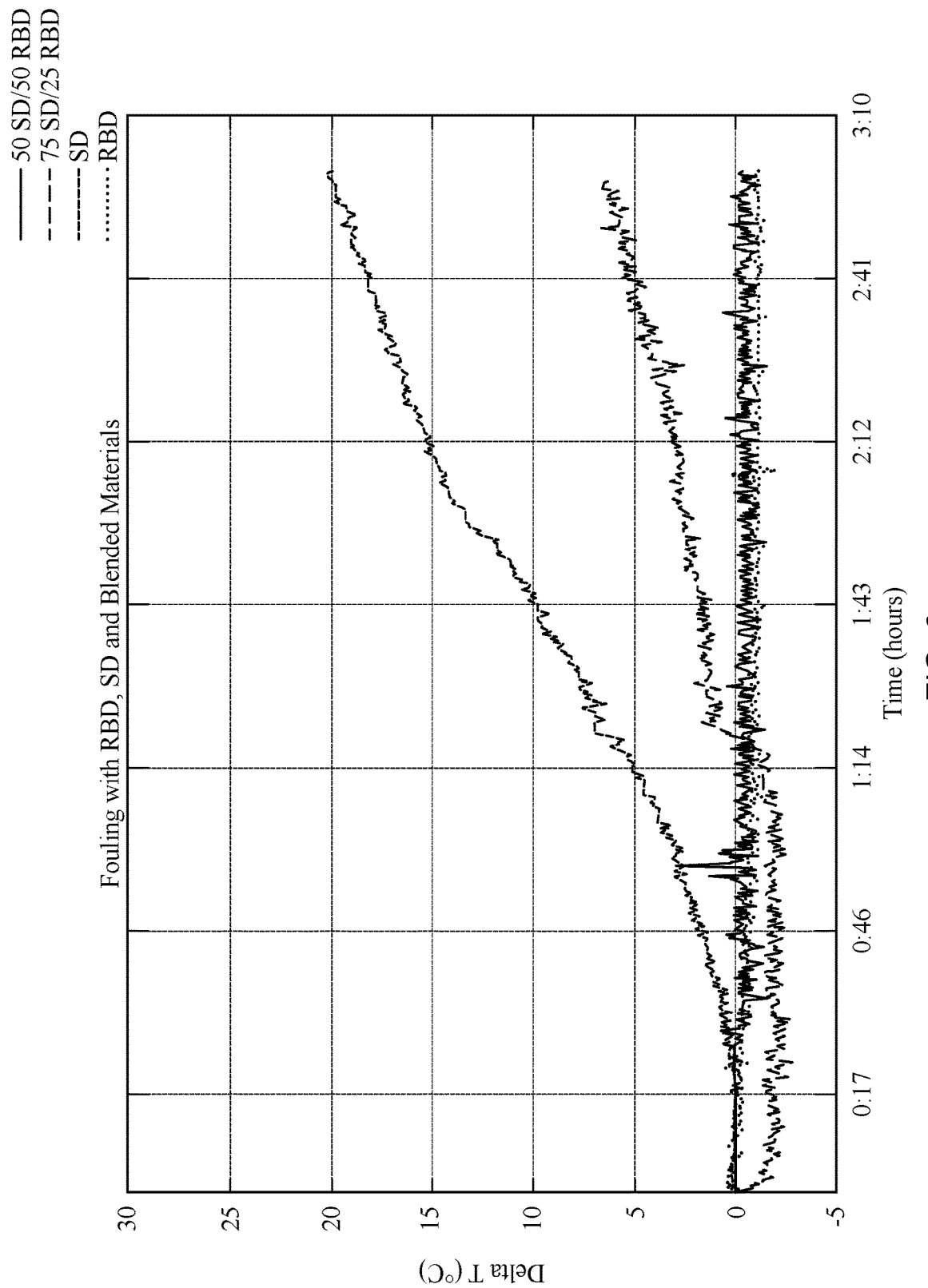
FIG. 6 is a graph illustration fouling from various biofeedstocks in accordance with one or more embodiments.

FIG. 6 illustrates fouling potential of the various canola oil samples. As illustrated, the $\Delta T$ for the pure RBD canola oil of Canola Oil Sample 1 was about 0° C. indicating RBD canola oil has low fouling potential. However, the opposite effect was observed for SD canola oil. The $\Delta T$ Canola Oil Sample 2 with pure SD canola oil was 20° C. indicating the fouling potential of SC canola oil is much higher than RBD canola oil. Two different blends of the RBD and SD canola oils were also tested to evaluate the fouling potential from blending the lower quality SC canola oil with a higher quality RBD canola oil. As illustrated, the $\Delta T$ for Canola Oil Sample 3 with 75 wt. % SD canola oil and 25 wt. % RBD canola oil was 7° C., which is significantly lower than the 20° C. for pure SD Canola Oil. If the fouling potential followed a linear relationship with concentration of blending components, the $\Delta T$ would have been at 15° C., which is more than double the actual measure value. Fouling potential is reduced even more significantly with 50 wt. % SD canola oil and 50 wt. % RBD canola oil of Canola Oil Sample 4. As illustrated, the $\Delta T$ for Canola Oil Sample 4 was only 2° C., which is 10% of the $\Delta T$ for the pure SD canola oil of Sample 2 even though this sampled include 50 wt. % of SD canola oil.

While the disclosure has been described with respect to a number of embodiments and examples, those skilled in the art, having benefit of this disclosure, will appreciate that other embodiments can be devised which do not depart from the scope and spirit of the disclosure as disclosed herein. Although individual embodiments are discussed, the present disclosure covers all combinations of all those embodiments.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the disclosure, additionally, they do not exclude impurities and variances normally associated with the elements and materials used.

All numerical values within the detailed description are modified by "about" the indicated value, and take into account experimental error and variations that would be expected by a person having ordinary skill in the art.

Many alterations, modifications, and variations will be apparent to those skilled in the art in light of the foregoing description without departing from the spirit or scope of the present disclosure and that when numerical lower limits and numerical upper limits are listed herein, ranges from any lower limit to any upper limit are contemplated.

The invention claimed is:

1. A method of producing renewable fuels, comprising:
hydrotreating a combined feedstock by contacting reactants comprising the combined feedstock and hydrogen with a hydrotreating catalyst to produce normal paraffins,
wherein the combined feedstock comprises a first biofeedstock and a second feedstock that are introduced together into a hydrotreating stage;
wherein the first biofeedstock has at least 10% more of each of metals, phosphorous, and chlorophyll than the second feedstock; and
wherein the first biofeedstock comprises the metals in an amount of about 300 parts per million ("ppm") or less, the phosphorous in an amount of about 300 ppm or less, and the chlorophyll in an amount of about 50 ppm or less; and
isomerizing at least a portion of the normal paraffins to produce branched paraffins in an isomerization effluent.

2. The method of claim 1, wherein the hydrotreating catalyst comprises at least one metal selected from the group consisting of a Group VIII metal, a Group VIB metal, and a combination thereof, and wherein the isomerizing is done in the presence of an isomerization catalyst comprising a Group VIII metal.

3. The method of claim 1, wherein the second feedstock is an additional biofeedstock comprising the metals in an amount of about 10 ppm or less, the phosphorous in an amount of about 10 ppm or less, and the chlorophyll in an amount of about 5 ppm or less.

4. The method of claim 3, wherein the first biofeedstock comprises the metals in an amount of 200 ppm or less, the phosphorous in an amount of about 200 ppm or less, and the chlorophyll in an amount of about 30 ppm or less.

5. The method of claim 4, wherein the first biofeedstock comprises the metals in an amount of about 50 ppm or less, and wherein the first biofeedstock comprises the phosphorous in an amount of about 50 ppm or less.

6. The method of claim 1, wherein the second feedstock comprises refined, bleached, and deodorized vegetable oil comprising the metals in an amount of 10 ppm or less, the phosphorous in an amount of about 2 ppm or less, and the chlorophyll in an amount of about 1 ppm or less, and wherein the first biofeedstock comprises degummed vegetable oil comprising the metals in an amount of about 200 ppm or less, the phosphorous in an amount of about 200 ppm or less, and the chlorophyll in an amount of about 30 ppm or less.

7. The method of claim 1, wherein the second feedstock comprises a petroleum feedstock.

8. The method of claim 1, wherein the combined feedstock comprises the first biofeedstock in an amount of about 1% to about 99% and the second feedstock in an amount of about 1% to about 99%.

9. The method of claim 1, wherein the combined feedstock comprises the first biofeedstock in an amount of about 40% to about 90% and the second feedstock in an amount of about 10% to about 60%.

10. The method of claim 1, further comprising combining the second feedstock and the first biofeedstock to form the combined feedstock and then introducing the combined feedstock into a hydrotreating reactor.

11. The method of claim 10, wherein the combined feedstock further comprises the second feedstock comprising metals in an amount of about 10 ppm or less, phosphorous in an amount of about 10 ppm or less, and chlorophyll in an amount of about 5 ppm or less.

12. The method of claim 1, further comprising separating the at least a portion of the paraffins from a reaction product of the hydrotreating.

13. The method of claim 1, further comprising recycling a portion of the paraffins from a reaction product of the hydrotreating to the hydrotreating of the biofeedstock, wherein the second feedstock comprises the portion of the paraffins.

14. The method of claim 1, further comprising separating at least a jet range fraction from the isomerization effluent.

15. The method of claim 1, further comprising separating at least a diesel range fraction from the isomerization effluent.

16. The method of claim 1, further comprising separating at least a diesel range fraction and a jet range fraction from the isomerization effluent.

17. The method of claim 1, further comprising separating at least a gaseous component comprising hydrogen from the isomerization effluent.

18. The method of claim 1, further comprising separating at least a naphtha fraction from the isomerization effluent.

19. A method of producing renewable fuels, comprising:
hydrotreating a combined biofeedstock by contacting the combined feedstock and hydrogen with a hydrotreating catalyst to produce normal paraffins,
wherein the combined feedstock comprises a first vegetable oil and a second vegetable oil that are introduced to the same hydrotreating stage;
wherein the second vegetable oil is a high-quality vegetable oil different from the first vegetable oil;
wherein the first vegetable oil is present in an amount of about 50% or less;
wherein the second vegetable oil has at least 10% more of each of metals, phosphorous, and chlorophyll than the first vegetable oil;
wherein the second vegetable oil comprises the metals in an amount of about 200 ppm or less, the phosphorous in an amount of 200 ppm or less, and the chlorophyll in an amount of about 30 ppm or less; and
wherein the first vegetable oil comprises the metals in an amount of about 10 ppm or less, the phosphorous in an amount of about 2 ppm or less, and the chlorophyll in an amount of about 1 ppm or less;
isomerizing at least a portion of the normal paraffins to produce branched paraffins in an isomerization effluent; and
separating at least a jet range fraction and a diesel range fraction from the isomerization effluent.

20. The method of claim 19, wherein the first vegetable oil comprises refined, bleached, and deodorized canola oil, and wherein the second vegetable oil comprises degummed canola oil.

21. The method of claim 19, wherein the second vegetable oil is present in an amount of about 25% or less.

22. The method of claim 19, further comprising separating at least a gaseous component comprising hydrogen from the isomerization effluent.

* * * * *